(12) United States Patent
Tsai et al.

(10) Patent No.: US 11,568,429 B2
(45) Date of Patent: Jan. 31, 2023

(54) DEMAND FORECASTING METHOD AND DEMAND FORECASTING APPARATUS

(71) Applicant: Wistron Corporation, New Taipei (TW)

(72) Inventors: Chi Lin Tsai, New Taipei (TW); Chi Hao Yu, New Taipei (TW); Wen Hsuan Lan, New Taipei (TW); Ling-Yu Kuo, New Taipei (TW); Han-Yi Shih, New Taipei (TW); Pei Yu Ho, New Taipei (TW)

(73) Assignee: Wistron Corporation, New Taipei (TW)

( * ) Notice: Subject to any disclaimer, the term of this patent is extended or adjusted under 35 U.S.C. 154(b) by 42 days.

(21) Appl. No.: 16/857,138

(22) Filed: Apr. 23, 2020

(65) Prior Publication Data

US 2021/0264449 A1 Aug. 26, 2021

(30) Foreign Application Priority Data

Feb. 20, 2020 (TW) ................................. 109105457

(51) Int. Cl.
*G06Q 30/02* (2012.01)
*G06N 7/00* (2006.01)
*G06Q 10/06* (2012.01)
*G06Q 10/08* (2012.01)

(52) U.S. Cl.
CPC ......... *G06Q 30/0202* (2013.01); *G06N 7/005* (2013.01); *G06Q 10/067* (2013.01); *G06Q 10/087* (2013.01)

(58) Field of Classification Search
None
See application file for complete search history.

(56) References Cited

U.S. PATENT DOCUMENTS

2017/0185904 A1* 6/2017 Padmanabhan .......... G06N 5/04
2021/0233153 A1* 7/2021 Zhang ................ G06Q 30/0201

FOREIGN PATENT DOCUMENTS

| CN | 106780173 | 5/2017 |
|----|-----------|--------|
| CN | 107248094 | 10/2017 |
| CN | 107274231 | 10/2017 |
| CN | 109284856 | 1/2019 |

OTHER PUBLICATIONS

Gurnani, M., et al., Forecasting of sales by using fusion of Machine Learning techniques, Feb. 24-26, 2017, 2017 Internation Conference on Data Management, Analytics and Innovation (ICDMAI) (Year: 2017).*

(Continued)

*Primary Examiner* — Cory W Eskridge
(74) *Attorney, Agent, or Firm* — JCIPRNET (57) ABSTRACT

A demand forecasting method and a demand forecasting apparatus are provided. A preliminary prediction amount corresponding to a part number is obtained based on historical demand data. A demand probability of the part number is calculated based on the preliminary prediction amount. A prediction demand amount corresponding to the part number is obtained based on the historical demand data, the preliminary prediction amount and the demand probability.

12 Claims, 4 Drawing Sheets

(56) References Cited

OTHER PUBLICATIONS

M. Tan, S. Yuan, S. Li, Y. Su, H. Li and F. He, "Ultra-Short-Term Industrial Power Demand Forecasting Using LSTM Based Hybrid Ensemble Learning," in IEEE Transactions on Power Systems, vol. 35, No. 4, pp. 2937-2948, Jul. 2020, doi: 10.1109/TPWRS.2019.2963109. (Year: 2019).*
N. Pawar and B. Tiple, "Analysis on Machine Learning Algorithms and Neural Networks for Demand Forecasting of Anti-Aircraft Missile Spare Parts," 2019 International Conference on Communication and Electronics Systems (ICCES), 2019, pp. 854-859, doi: 10.1109/ICCES45898.2019.9002411. (Year: 2019).*
"Office Action of Taiwan Counterpart Application", dated Jan. 21, 2021, p. 1-p. 17.

* cited by examiner

DEMAND FORECASTING METHOD AND DEMAND FORECASTING APPARATUS

CROSS-REFERENCE TO RELATED APPLICATION

This application claims the priority benefit of Taiwan application no. 109105457, filed on Feb. 20, 2020. The entirety of the above-mentioned patent application is hereby incorporated by reference herein and made a part of this specification.

TECHNICAL FIELD

The invention relates to an inventory simulation technique, and more particularly, relates to a demand forecasting method and a demand forecasting apparatus.

BACKGROUND

Predicting demand accurately is an important part in the field of inventory. If inventory can be accurately predicted, a large amount of unnecessary inventory may be reduced to achieve and a cost saving effect while satisfying customer needs. The longer the system runs, the greater the savings. In terms of service parts, during a specific time from the start to the end of product service time, necessary parts are to be provided to meet the needs of customers for repair or replacement. For suppliers, if the demand for parts can be predicted and handled more accurately, parts inventory may be circulated in a shorter time to create revenue, and reduce the cost backlog caused by inactive parts.

Most of the existing inventory forecasting technologies use a time series method with data to formulate forecasts. The defects of the prior art are roughly the following three points. (1) The data cannot be fully utilized, and the limits of time series can usually only consider a few variables. Therefore, even though the information included in the data is rich, because people have limited understanding of the data, the variables that may be considered in the final formula used to produce predictions may only be 10 variables at the most. (2) Because these formulas for output prediction are derived from the accumulation of human experience, it is difficult to make a systematic inheritance and transfer when someone leaves or is replaced. (3) The current system cannot be quickly expanded to different regions. In simple terms, as the demand patterns in Europe, the United States, and Asia are different, if localized predictions are to be made for different regions, three teams are then required to carry out experience accumulation and development of formulas.

SUMMARY

The invention provides a demand forecasting method, which can fully consider all data variables and eliminate artificial calculation errors to thereby obtain more accurate prediction results.

A demand forecasting method in an embodiment of the invention includes: obtaining a preliminary prediction amount corresponding to a part number based on historical demand data; calculating a demand probability of the part number based on the historical demand data and the preliminary prediction amount; and obtaining a prediction demand amount corresponding to the part number based on the historical demand data, the preliminary prediction amount and the demand probability.

In an embodiment of the invention, the demand forecasting method further includes: converting a format of the historical demand data to obtain a plurality of features corresponding to the part number. The features include a plurality of parameters corresponding to a plurality of previous periods, a plurality of parameter average values within a plurality of period ranges and a maximum value among the parameters included in each of the period ranges.

In an embodiment of the invention, the demand forecasting method further includes: constructing an XGBoost (eXtreme Gradient Boosting) model, the XGBoost including a linear model, a classifier and an XGBoost regression model.

In an embodiment of the invention, the step of obtaining the preliminary prediction amount corresponding to the part number based on the historical demand data includes: inputting the features to the linear model to thereby obtain the preliminary prediction amount.

In an embodiment of the invention, the demand forecasting method further includes: constructing the classifier by using an XGBoost algorithm to input the features and the preliminary prediction amount to the classifier to obtain the demand probability. The demand probability is a probability that a future demand of the part number is 0.

In an embodiment of the invention, the step of obtaining the prediction demand amount corresponding to the part number based on the historical demand data, the preliminary prediction amount and the demand probability includes: inputting the features, the demand probability and the preliminary prediction amount to the XGBoost regression model to obtain the prediction demand amount.

In an embodiment of the invention, the demand forecasting method further includes: deconstructing the XGBoost model to obtain an influence of each of the features in the historical demand data. Here, the XGBoost model includes a plurality of trees, and the step of deconstructing the XGBoost model includes: visiting each node starting from a root node of each of the trees to a lowest layer; attributing a variation amount to the corresponding feature based on a rule corresponding to each node visited; and summing up the variation amounts corresponding to each of the features as the corresponding influence thereof.

In an embodiment of the invention, after the step of obtaining the prediction demand amount corresponding to the part number, the method further includes: determining a threshold based on a ratio of a number of the part numbers with a previous actual demand being zero to a total number of the part numbers; in response to the demand probability corresponding to the part number greater than or equal to the threshold, setting the prediction demand amount to zero; and in response to the demand probability corresponding to the part number less than the threshold, outputting the prediction demand amount as a final prediction result.

A demand forecasting apparatus in an embodiment of the invention includes: a storage device, storing a plurality of program code segments; and a processor, coupled to the storage device, and executing the program code segments to: obtain a preliminary prediction amount corresponding to a part number based on historical demand data; calculate a demand probability of the part number based on the historical demand data and the preliminary prediction amount; and obtain a prediction demand amount corresponding to the part number based on the historical demand data, the preliminary prediction amount and the demand probability.

Based on the above, the embodiments of the invention can be used to fully consider all data variables and eliminate artificial calculation errors to thereby obtain more accurate prediction results.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
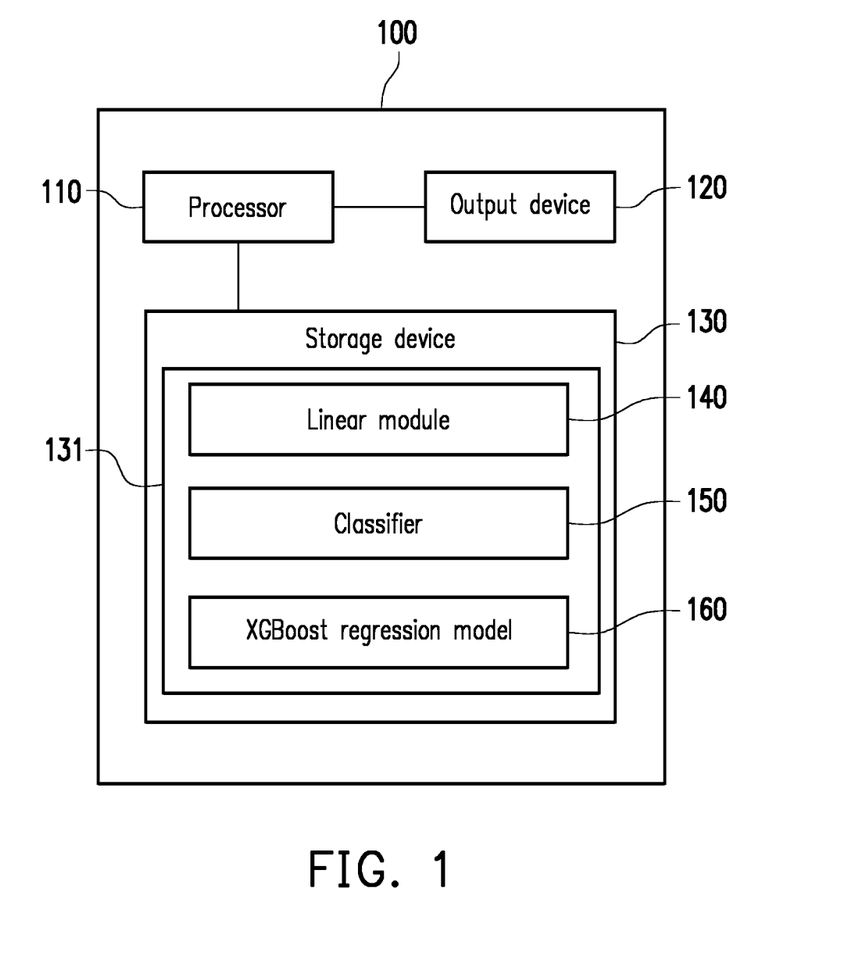
FIG. 1 is a block diagram of an electronic apparatus according to an embodiment of the invention.

FIG. 1 is a block diagram of an electronic apparatus according to an embodiment of the invention. Referring to FIG. 1, an electronic apparatus 100 includes a processor 110, an output device 120 and a storage device 130. The processor 110 is coupled to the output device 120 and the storage device 130.

The processor 110 is, for example, a central processing unit (CPU), a physics processing unit (PPU), a microprocessor, an embedded control chip, a digital signal processor (DSP), an application specific integrated circuits (ASIC) or other similar devices.

The output device 120 may be a cathode ray tube (CRT) display, a liquid crystal display (LCD), a plasma display, a touch display or the like. Alternatively, the output device 120 may be a printer.

The storage device 130 is, for example, any fixed or a movable device including a RAM (Random Access Memory), a ROM (Read-Only Memory), a flash memory, a hard drive or other similar devices, or a combination of the above-mentioned devices. Multiple program code segments are stored in the storage device 130, and after being installed, the program code segments are executed by the processor 110 to realize the demand forecasting method below.

For instance, the storage device 130 is stored with an inventory simulation system, and an XGBoost (eXtreme Gradient Boosting) model 131 is constructed through the inventory simulation system. The XGBoost model 131 includes a linear model 140, a classifier 150 and an XGBoost regression model 160.

Here, the linear model 140 obtains a preliminary prediction amount corresponding to a part number based on a plurality of features in historical demand data. The classifier 150 is configured to predict a probability that a future demand of the part number is 0. The XGBoost regression model 160 is configured to obtain a prediction demand amount corresponding to the part number.

The XGBoost regression model 160 is a tree-based model with the main concept of using different data features to construct rules that can be commonly used for most data to thereby achieve the purpose of subsequent prediction. In the XGBoost regression model 160, each split node is measured using the entropy in the theory of information gain. It is expected that the goal of reducing the level of information confusion is achieved after each split. The composition of the XGBoost regression model 160 may be hundreds of trees (classifiers), That is, the XGBoost regression model 160 is a strong classifier (a large tree model) formed by integration of many weak classifiers (small tree models).

Figure 2:
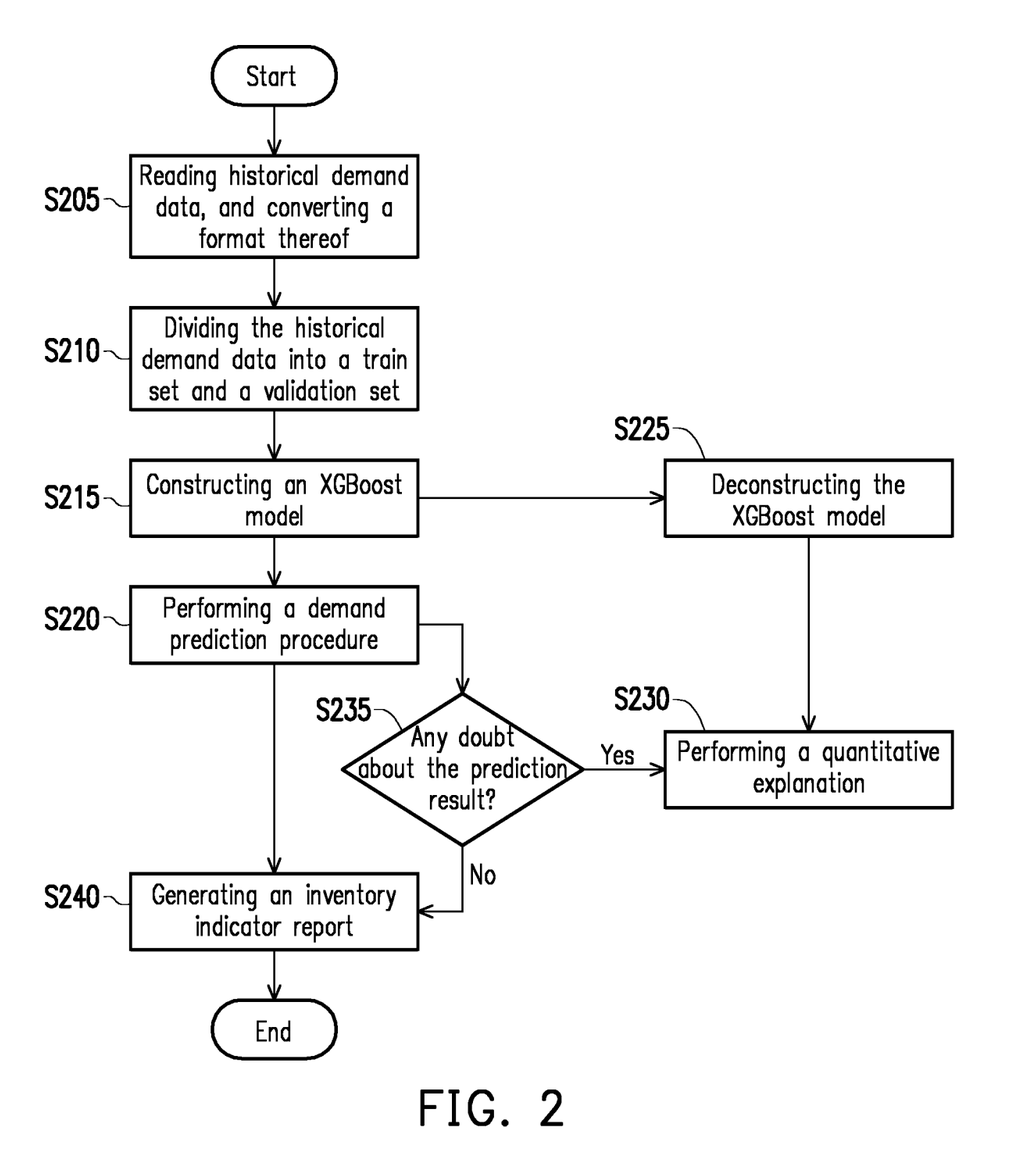
FIG. 2 is a flowchart of a demand forecasting method according to an embodiment of the invention.

FIG. 2 is a flowchart of a demand forecasting method according to an embodiment of the invention. Referring to FIG. 1 and FIG. 2, in step S205, the processor 110 reads, from a database, the historical demand data, and converts a format thereof. Here, before obtaining the features to be input to the linear model 140 from the historical demand data, raw data of the historical demand data needs to be converted to ensure that the data is considered more comprehensively when constructing the XGBoost model 131.

Specifically, the format of the historical demand data is converted to obtain a plurality of features corresponding to the part number. The features include a plurality of parameters corresponding to a plurality of previous periods, a plurality of parameter average values within a plurality of period ranges and a maximum value among the parameters included in each of the period ranges.

Table 1 shows the raw data of a part of the historical demand data. Although only the fields "ord_pn", "country", "qty", and "yyyymm" are listed in Table 1, the number and content of the fields of the raw data are not limited herein. The field "ord_pn" records a serial number of the part number, the field "country" records a region, the field "qty" records an actual demand amount, and the field "yyyymm" records time.

TABLE 1

| ord_pn | 717376-001 | 717376-001 | 717376-001 | 717376-001 | 717376-001 | 717376-001 |
|---|---|---|---|---|---|---|
| country | EMEA | EMEA | EMEA | EMEA | EMEA | EMEA |
| ... | ... | ... | ... | ... | ... | ... |
| qty | 1 | 1 | 0 | 1 | 0 | 1 |
| ... | ... | ... | ... | ... | ... | ... |
| yyyymm | 2011-01 | 2011-10 | 2013-12 | 2013-12 | 2013-12 | 2014-01 |

In Table 1, each data is stored in chronological order. If the raw data is directly used to construct the XGBoost model 131, it will cause a defect that pre- and post-sequence is not fully considered. Because an XGBoost algorithm is a tree-based learning and each split point is mainly based on the fields, this type of algorithm (the algorithm of the tree-based model) is unable to consider demands in previous and subsequent periods by referring to the raw data listed in Table 1. Therefore, before the XGBoost model 131 is constructed, the raw data is converted according to another storage method so that the XGBoost algorithm can predict the future demand by referring to the demands in the previous and subsequent periods of each part number.

Table 2 shows converted data after converting the format of a part of the historical demand data. In Table 2, only the field "GID", the field "REGION", the field "fcst_date", the field "x_month_01" to the field "x_month_06" are listed for explanation. The number and content of the fields of the converted data are not limited herein. The field "GID" records a group ID and may further record the serial number of the corresponding part number. The field "REGION" records the region. The field "fcst_date" records a forecasting date at the end of each month. The field "x_month_01" to the field "x_month_06" record demand amounts in the first month to the sixth month before the corresponding forecasting date. The field "yyyymm" records time. The field "QTY" records a demand amount of the month corresponding to the field "yyyymm".

TABLE 2

| GID REGION | 717376-001 EMEA | 717376-001 EMEA | 717376-001 EMEA | 717376-001 EMEA | 717376-001 EMEA | 717376-001 EMEA |
|---|---|---|---|---|---|---|
| fcst_date | 2017.01.31 | 2017.02.28 | 2017.03.31 | 2017.04.30 | 2017.05.31 | 2017.06.30 |
| x_month_01 | 2679 | 3909 | 4099 | 4448 | 3466 | 4102 |
| x_month_02 | 2763 | 2679 | 3909 | 4099 | 4448 | 3466 |
| x_month_03 | 2477 | 2763 | 2679 | 3909 | 4099 | 4448 |
| x_month_04 | 3029 | 2477 | 2763 | 2679 | 3909 | 4099 |
| x_month_05 | 2441 | 3029 | 2477 | 2763 | 2679 | 3909 |
| x_month_06 | 2868 | 2441 | 3029 | 2477 | 2763 | 2679 |
| ... | ... | ... | ... | | | |
| yyyymm | 2016-12 | 2017-01 | 2017-02 | 2017-03 | 2017-04 | 2017-05 |
| QTY | 2076 | 3909 | 4099 | 4448 | 3466 | 4102 |

In Table 2, it can be found that the data is converted into the same data stored a last month usage (x_month01), a last 2 months usage (x_month_02) . . . until a last 6 months usage (x_month_06). fcst_date indicates a current time point. For example, "2017.01.31" indicates that a next month usage of the part number "717376-001" is to be predicted at the time point of 2017.01.31. Here, the last 6 months usage of the part number will be taken in consideration. That is to say, if the format of this data is used in conjunction with the algorithm of the tree-based model to make predictions, as more selections are available even though the split nodes are still made according to the fields, influences from the past few month may also be taken into consideration rather than reference only based on the last month. It is worth mentioning that, in an embodiment, the similar data converting process is performed on sequence parameters (e.g., including demand and a circulating usage (wib) since warranty date) suggested by a part planner to ensure that the data considered by the algorithm is more comprehensive. Naturally, there can be many other conversions, and the content mentioned in Table 2 is for convenience only. The characteristics of the conversion are not limited herein.

Next, in step S210, the processor 110 divides the historical demand data into a train set and a validation set. In order to accurately predict the future demand, the train set and validation set should be divided and verified as close to the actual situation as possible. Here, the division is performed in the order of the occurrence of the data. Data before a certain time point is divided as the train set to train the model, and data after the certain time point is divided as the validation set to verify the accuracy of the model. For example, with time 2017-12-31 used for the division, data before 2017-12-31 is used as the train set, and data after 2017-12-31 is used as the validation set.

It is worth noting that it is indeed necessary to divide the train set and the verification set when the system is being verified. Nonetheless, after verifying that the system is credible, the latest data available may all be used as the train set to predict the future demand. The validation set is used to generate predicted values to be output to the inventory simulation system for generating reports indicating an overall forecasting performance.

In step S215, the XGBoost model 131 is constructed. The XGBoost model 131 includes the linear model 140, the classifier 150 and the XGBoost regression model 160. Here, a linear regression algorithm is used to construct the linear model 140. The XGBoost algorithm is used to construct the classifier 150 and the XGBoost regression model 160. The reason for constructing the linear model 140 is that good predictions on some part numbers may be obtained simply using the linear regression. Therefore, when the linear model 140 and the XGBoost regression model 160 are used at the same time, a final prediction result may be more accurate.

Figure 3:
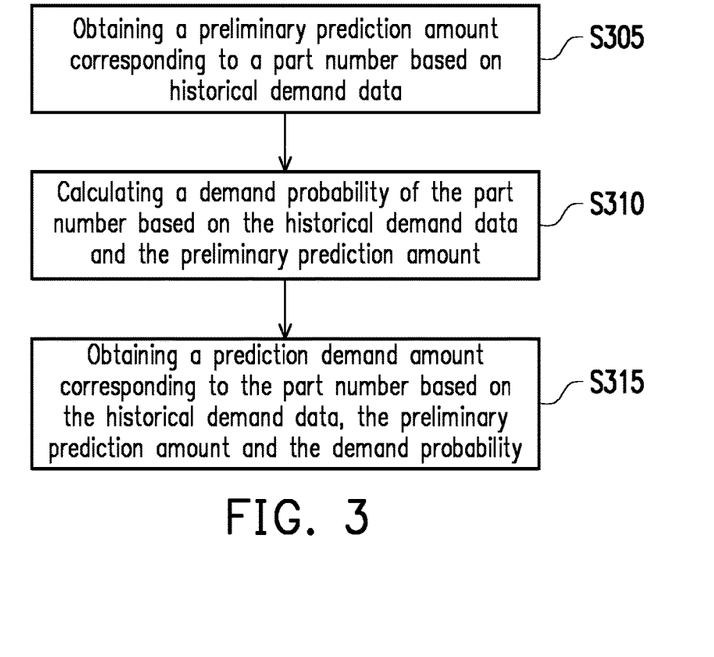
FIG. 3 is a flowchart of a demand forecasting procedure performed according to an embodiment of the invention.

After the XGBoost model 131 is constructed, in step S220, a demand forecasting procedure is performed by using the XGBoost model 131. FIG. 3 is a flowchart of a demand forecasting procedure performed according to an embodiment of the invention. Referring to FIG. 3, in step S305, a preliminary prediction amount corresponding to a part number is obtained based on historical demand data. Next, in step S310, a demand probability of the part number is calculated based on the historical demand data and the preliminary prediction amount. Then, in step S315, a prediction demand amount corresponding to the part number is obtained based on the historical demand data, the preliminary prediction amount and the demand probability.

First of all, multiple fields are selected from the converted data as features (variables) of the part number. Here, the features may be obtained through a trial-and-error learning. In addition, the features may also be selected depending on the actual situation, or all the fields may be selected as the features. The features include a plurality of parameters corresponding to a plurality of previous periods (e.g., the last month usage, the last 2 months usage and so on), a plurality of parameter average values within a plurality of period ranges (e.g., an average value of the last month usage, an average value of the last 2 months usage and so on) and a maximum value among the parameters included in each of the period ranges. Next, the features are input to the linear model 140 so that the preliminary prediction amount corresponding to the part number may be generated using the linear model 140. The features and the preliminary prediction amount will become new variables to be input to the classifier 150 for training.

Here, the classifier 150 is trained by using the XGBoost algorithm, and the demand probability of whether the future demand of the part number is classified as 0 (another new variable) is calculated through the classifier 150. Afterwards, the features and the generated new variable (including the preliminary prediction amount and the demand probability) are input to the XGBoost regression model 160.

The XGBoost regression model 160 includes many trees and these trees are like many rules. When new data comes in and needs to be predicted, whether the new data meets the rules may be determined by following these trees, and the prediction may be made by selecting different paths to one lowest point.

Figure 4:
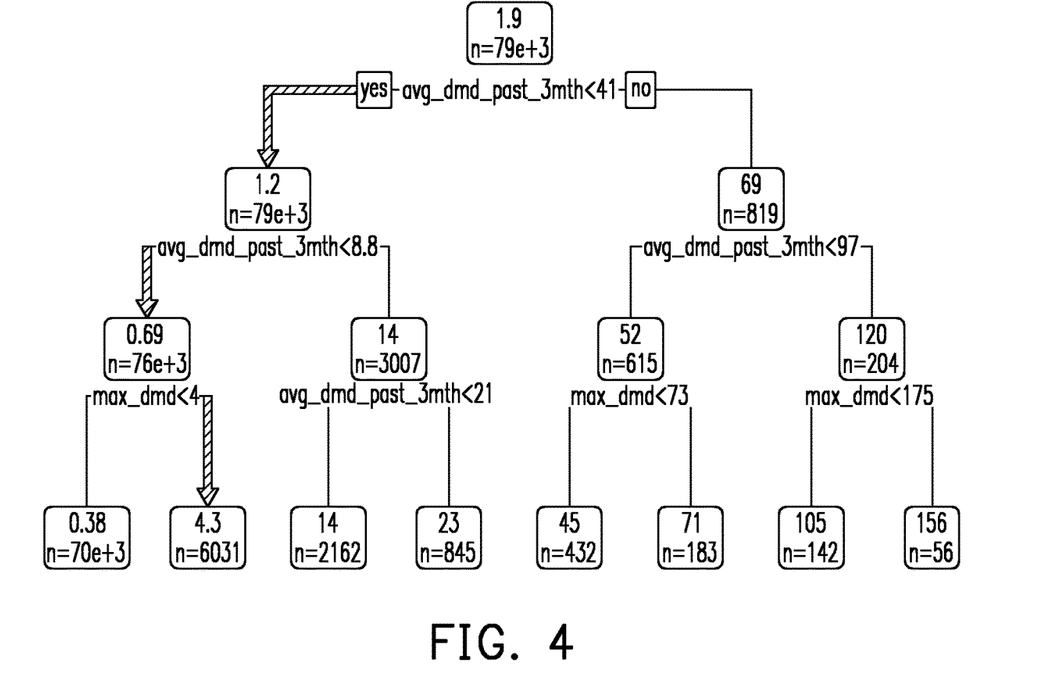
FIG. 4 is a schematic diagram illustrating one of trees in an XGBoost regression model according to an embodiment of the invention.

FIG. 4 is a schematic diagram illustrating one of trees in an XGBoost regression model according to an embodiment of the invention. Referring to FIG. 4, each node in FIG. 4 is the feature (variable); a topmost value in each node indicates an initial prediction value; and "n" indicates the number of data divided to the respective node. Here, "avg_dmd_past_3mth" indicates the average value of the last 3 months usage, and "max_dmd" indicates a maximum usage. Each node has a determination rule. In this embodiment, it is assumed that a left branch is selected if the rule corresponding to the node is met, and a right branch is selected if the rule corresponding to the node is not met.

Starting from the top node in FIG. 4 (with the prediction value of 1.9), whether the average value of the last 3 months usage of the data is less than 41 is determined. If the average value of the last 3 months usage of the data is less than 41, the left branch is selected and the prediction value is updated to 1.2. Otherwise, the right branch is selected and the predicted value is updated to 69. By analogy, when each data being is being predicted, which branch to be selected will be determined according to the rule corresponding to each node. That is, for each branch, one of left and right paths is taken, and the prediction demand amount may be generated once the bottom is reached.

In this embodiment, it is assumed that the average value of the last 3 months usage is less 41. Accordingly, the left branch is selected and the predicted value is updated to 1.2. Next, it is assumed that the average value of the last 3 months usage is less 8.8. Accordingly, the left branch is selected and the predicted value is updated to 0.69. Next, it is assumed that the maximum usage is greater than or equal to 4. Accordingly, the right branch is selected and the predicted value is updated to 4.3. Lastly, the predicted value of 4.3 is used as the prediction demand amount.

After being obtained, the prediction demand amount corresponding to the part number may be further filtered according to the demand probability. That is, a threshold is determined based on a ratio of a number of the part numbers with a previous actual demand being zero to a total number of the part numbers. If the demand probability (the probability that the future demand is zero) corresponding to the part number is greater than or equal to the threshold, the prediction demand amount is set to zero. If the demand probability (the probability that the future demand is zero) corresponding to the part number is less than the threshold, the prediction demand amount is output as the final prediction result.

Further, as shown in Table 3, the demand probability may be quantified and then compared with the threshold.

TABLE 3

| Prediction demand amount | Demand probability | Quantified demand probability | Final predication result |
|---|---|---|---|
| 2 | 0.95 | 1 | 0 |
| 4 | 0.8 | 0.8 | 0 |
| 101 | 0.6 | 0.6 | 101 |
| 23 | 0.4 | 0.4 | 23 |
| 84 | 0.3 | 0.2 | 84 |

As shown in Table 3, five prediction demand amounts are included. First, the five prediction demand amounts are sorted according to a rank of the demand probability. Then, the demand probability is quantified according to the number of amounts to obtain quantified demand probabilities. For example, if there are 5 prediction demand amounts, the quantified demand probabilities from small to large is set to 0.2, 0.4, 0.6, 0.8, and 1. Then, the ratio of the part number with the actual demand being zero last month to the total number of the part numbers is calculated. It is assumed that 20% of the part numbers have the actual demand being 0 last month. Accordingly, it is set to modify the prediction demand amounts corresponding to the quantified demand probabilities higher than 20% all to zero. In Table 3, the prediction demand amounts corresponding to the quantified demand probabilities 1 and 0.8 are both set to 0. In other words, the threshold is set to 0.8, and the prediction demand amounts corresponding to the quantified demand probability greater than or equal to 0.8 are set to 0.

Returning to FIG. 2, after the XGBoost model 131 is constructed, in step S225, the XGBoost model 131 is deconstructed through an XGBoost explainer. The reason why the XGBoost model 131 can be constructed is because the construction needs to be made by exploring the rules of the overall data from a macro perspective. However, if the tree-based model in the XGBoost model 131 is to be explained, the explanation needs to be made from a micro perspective (deconstructed from the perspective of visiting one single data of the tree). The process of deconstructing one single data is similar to what indicated by arrows shown in FIG. 4, and the arrow is the result of visiting each specific data of the tree according to its own condition.

From a deconstruction point of view, an attribution is made to the path visited by the data. That is, each node is visited starting from a root node of each of the trees to a lowest layer, a variation amount is attributed to the corresponding feature based on a rule corresponding to each node visited, and the variation amounts corresponding to each of the features are summed up as a corresponding influence thereof. In terms of the arrows in FIG. 4, because of the rule of "avg_dmd_past_3mth<41", the variation amount "–0.7" of the prediction value from 1.9 to 1.2 is attributed to the feature of "avg_dmd_past_3mth". Next, because of the rule of "avg_dmd_past_3mth<8.8", the variation amount "–0.51" of the prediction value from 1.2 to 0.69 is attributed to the feature of "avg_dmd_past_3mth". Next, because of the rule of "max_dmd<4", the variation amount "3.61" of the prediction value from 0.69 to 4.3 is attributed to the feature of "max_dmd". The same attribution is performed all the way down to the lowest layer of the trees, each of the variation amounts is attributed to the corresponding feature, and the variation amounts corresponding to each of the features are summed up as the influence corresponding to the respective feature. Finally, a comparison chart of the influence of each of the features is generated.

Figure 5:
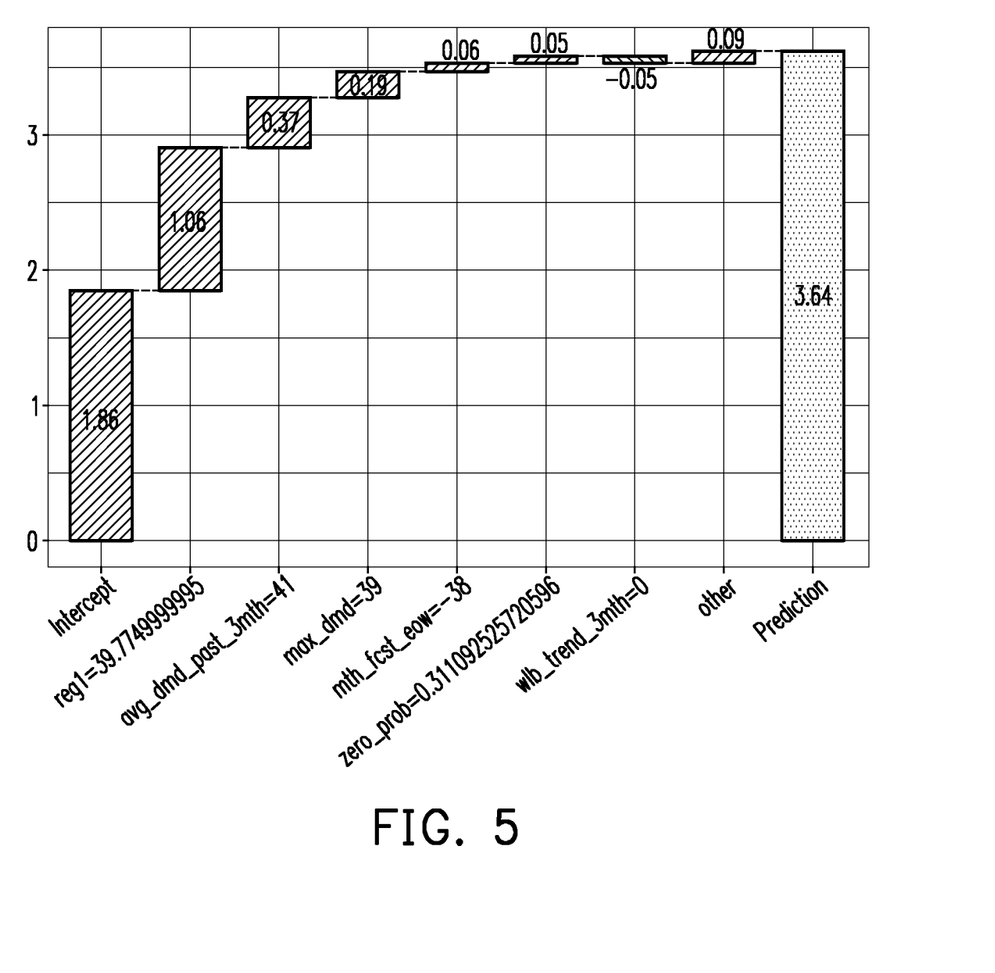
FIG. 5 is a comparison chart of feature influences according to an embodiment of the invention.

FIG. 5 is a comparison chart of feature influences according to an embodiment of the invention. The comparison chart may be output by the output device 120 and checked by the part planner. FIG. 5 is interpreted as a sequence of features and the influences thereof from left to right (importance: from important to unimportant). It can be seen from the chart that each of the features may be positive or negative (e.g., –0.05), and "prediction" at the last is a sum of all the influences. In this embodiment, features "reg1" (the preliminary prediction amount), "avg_dmd_past_3mth" (the average value of the last 3 months usage), "max_dmd" (the maximum usage), "mth_fcst_eow" (months from the end of warranty date to the forecasting date at the end of each month), "zero_prob" (the demand probability) and "wib_trend_3mth" (a wib trend within 3 months) are listed. Some features are merged into "other" because of insufficient influence. That is, "other" is formed by a combination of many features, and intended to simplify this chart. "Intercept" is not the feature of the original data set but a given constant value. In other words, among charts deconstructed from the same model, such value of each chart will be the same, which can be understood as similar to the intercept term in the linear regression. In other embodiments, when outputting the comparison chart, the output device 120 may mark the features with different colors, and may also mark the influences of the features with different colors. For example, the features with positive influence may be marked as blue, and the features with negative influence may be marked as red.

If the prediction demand amount of the present data is 100, the influence caused by the feature "reg1" is reversed, i.e., $$100 \times \frac{1.06}{3.64} = 29.12.$$

That is, the feature "reg1" contributes an amount of 29.12 to the prediction value. After the XGBoost model 131 is deconstructed, the comparison chart may be output by the output device 120. Then, in step S230, a quantitative explanation is performed. In an embodiment, after the output device 120 outputs the comparison chart, when receiving a quantitative explanation command of any feature, the output device 120 may display the quantitative explanation corresponding to that feature. After the output device 120 outputs the comparison chart, the part planner may select the feature for the quantitative explanation so that the output device 120 can further display the quantitative explanation corresponding to that feature.

After the final prediction result is obtained, in step S235, whether there is any doubt about the prediction result is determined. If there is any doubt about the prediction result, in step S230, the quantitative explanation is performed. If there is no doubt about the prediction result, in step S240, an inventory indicator report is generated. Then, the inventory indicator report is output by the output device 120. In addition, it is also possible that the inventory indicator report is directly generated without going through step S235.

For example, the inventory indicator report includes a forecast accuracy indicator, an inventory reduction indicator, a potential inventory indicator, and a customer satisfaction level indicator. The forecast accuracy indicator is an indicator to measure the accuracy of the algorithm. The inventory reduction indicator and the potential inventory indicator are used as indicators of how much money is saved. Among them, inventory used in the inventory reduction indicator indicates inventory that may still be consumed. Inventory used in the potential inventory indicator indicates inventory that cannot be consumed after an authorization period or warranty date of the product is over. The inventory reduction indicator is a value of a total cost calculated by subtracting a total cost obtained by an old system from the prediction demand amount given each month obtained based on the above embodiments multiplied by a cost of each part number. The customer satisfaction level indicator indicates a customer satisfaction level. For example, if a customer's demand is 10 pieces but only 9 pieces can be provided, the customer satisfaction level indicator is 90%. For example, if the customer's demand is 10 pieces but more than 10 pieces can be provided, the customer satisfaction indicator level is 100%. However, it should be noted that one should not prepare too many parts just for 100% of the customer satisfaction level indicator but still need have the inventory reduction indicator and potential inventory indicator taken into consideration.

In step S235, the output device 120 displays the prediction demand amount so that the part planner can determine whether there is any doubt about the prediction result. If the part planner has doubt about the prediction result, in step S230, the part planner may filter out the part number having an overly large difference between the prediction demand amount and an actual value within a validation interval through the output device 120. Table 4 shows one prediction result of an embodiment.

TABLE 4

| GID | Anna-AB-73-SP |
|---|---|
| fcst_date | 2019 Jan. 31 |
| x_month_03 | 72 |
| x_month_02 | 72 |
| x_month_01 | 59 |
| y_month_01 | 110 |
| fcst_m1 | 36.40958 |
| ... | ... |

Taking Table 4 as an example, "y_month_01" indicates the actual value, "fcst_m1" indicates the prediction demand amount, and "x_month_01" to "x_month_03" indicate the usages in the last 1 to 3 months. Here, the actual value differs from the prediction demand amount of 36.40958 by an amount of approximately 73 pieces, which is then filtered out as a prediction for potential problems. Then, the part planner will check the performance of the data. For example, after checking "x_month_01" to "x_month_03" and finding out that the amounts of the past are almost the same level, the part planner may read the chart of the explainer of this data for reference through the output device 120 (e.g., have FIG. 5 displayed through the output device 120). If the level of the data in the past differs too much from the level of the future such that this kind of trend is unlikely to be predicted by using any algorithm, the part number may be marked as a surge demand. Accordingly, when calculating the customer satisfaction level indicator, the part numbers with such a greater difference can be excluded.

In summary, according to the embodiments, a preliminary prediction is executed by using the linear regression. Then, the obtained preliminary prediction amount is input as a variable to the second-stage classifier for learning so that the demand probability that the future demand of the material number is 0 may then obtained. Afterwards, previously used variables (including the preliminary prediction amount and the demand probability newly created) are input to the XGBoost regression model 160 to obtain the prediction demand amount.

The XGBoost model in the field of machine learning is introduced as the main algorithm for prediction. The XGBoost model is suitable for calculation of large-scale data. Strictly speaking, by inputting all data variables to the XGBoost model to generate results, artificial calculation errors may be eliminated. Accordingly, the data referenced in the forecasting will be more comprehensive compared to the existing methods for obtaining a more accurate prediction demand amount so that inventory may be effectively controlled to save costs. In addition, after verification, it was found that a customer confidence level may be maintained based on the indicators for measuring the pros and cons of the field of inventory (a saving indicator and a customer confidence level).

In addition, the system using the XGBoost model can provide a user interface to easily generate the prediction result even without human intervention at all. Simply by letting the developed system automatically generate the result when the prediction are to be output, the inconvenience caused by personnel replacement may be reduced or avoided.

In addition, as a usage premise, the system using the XGBoost model can simply operate as long as data for different regions can be provided. A pattern identification and important information extraction may be finished for regional data within hours to create the model and provide accurate prediction. Therefore, the scalability (the ability to quickly apply the same system to different regions for prediction) and portability (the ability to switch the system to operate on different computers) of the invention are better than existing systems.

In addition, according to the embodiments of the invention, a technology that can make the XGBoost algorithm explainable (the XGBoost explainer) is also introduced, so that the prediction result becomes explainable. The so-called "explainable" refers to that, after the prediction demand amount of a specific part number is given, the part planner (customer/system user/decision maker) will want to know how the prediction demand amount comes from. That is to say, if the data used in the forecast include parameters such as a current cycle of the product, a total number of part numbers circulating during warranty period, and demand for the part in the past few months, these prediction results may be explained. In addition to using the XGBoost model to provide accurate predictions in the embodiments of the invention, a quantified influence of each feature (variable) on the prediction is also provided. The quantified influence includes positive or negative influences of the feature on the prediction demand amount, as well as a quantity of the amount, so that the part planner can receive information quickly.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A demand forecasting method, comprising:
converting, by a processor, a format of historical demand data to obtain a plurality of features corresponding to the part number;
dividing, by the processor, the historical demand data based on an order of occurrence of the historical demand data for setting the historical demand data before a specified time point as a train set;
constructing, by the processor, an XGBoost (eXtreme Gradient Boosting) model, wherein the XGBoost model comprises a linear model constructed by using a linear regression algorithm, a classifier constructed by using an XGBoost algorithm and an XGBoost regression model constructed by using the XGBoost algorithm, the XGBoost algorithm is a tree-based learning;
training the XGBoost model by the processor, comprising training the linear model based on the train set, training the classifier based on the train set and an output of the linear model, and training the XGBoost regression based on the train set, the output of the linear model and an output of the classifier; and
performing, by the processor, a demand forecasting procedure by using the XGBoost model after the XGBoost model is trained, wherein performing the demand forecasting procedure comprises:
obtaining, through the linear model, a preliminary prediction amount corresponding to a part number by inputting the features to the linear model;
calculating, through the classifier, a demand probability of the part number by inputting the features and the preliminary prediction amount to the classifier, wherein the demand probability is a probability that a future demand of the part number is 0; and
obtaining, through the XGBoost regression model, a prediction demand amount corresponding to the part number by inputting the features, the preliminary prediction amount and the demand probability to the XGBoost regression model, wherein the XGBoost regression model includes a plurality of trees for classification,
wherein after obtaining the prediction demand amount corresponding to the part number, the method further comprises:
generating, by the processor, an inventory indicator report based on a result outputting from the XGBoost model; and
performing, by the processor, a quantitative explanation corresponding to one of the features in response to receiving a quantitative explanation command of the one of the features, wherein the quantitative explanation is performed by deconstructing the XGBoost model.

2. The demand forecasting method according to claim 1, wherein the features comprise a plurality of parameters corresponding to a plurality of previous periods, a plurality of parameter average values within a plurality of period ranges and a maximum value among the parameters included in each of the period ranges.

3. The demand forecasting method according to claim 1, further comprising:
constructing, by the processor, the classifier by using an XGBoost algorithm to input the features and the preliminary prediction amount to the classifier to obtain the demand probability.

4. The demand forecasting method according to claim 1, further comprising:
deconstructing, by the processor, the XGBoost model to obtain an influence of each of the features in the historical demand data.

5. The demand forecasting method according to claim 4, wherein the XGBoost model comprises a plurality of trees, and the step of deconstructing, by the processor, the XGBoost model comprises:
visiting each node starting from a root node of each of the trees to a lowest layer;
attributing a variation amount to the corresponding feature based on a rule corresponding to each node visited; and
summing up the variation amounts corresponding to each of the features as the corresponding influence thereof.

6. The demand forecasting method according to claim 1, wherein after the step of obtaining, through the XGBoost regression model, the prediction demand amount corresponding to the part number, the method further comprises:
determining, by the processor, a threshold based on a ratio of a number of the part numbers with a previous actual demand being zero to a total number of the part numbers;
in response to the demand probability corresponding to the part number greater than or equal to the threshold, setting, by the processor, the prediction demand amount to zero; and
in response to the demand probability corresponding to the part number less than the threshold, outputting, by the processor, the prediction demand amount as a final prediction result.

7. A demand forecasting apparatus, comprising:
a storage device, storing an XGBoost (eXtreme Gradient Boosting) model; and
a processor, coupled to the storage device, and configured to:
convert a format of historical demand data to obtain a plurality of features corresponding to the part number;

divide the historical demand data based on an order of occurrence of the historical demand data for setting the historical demand data before a specified time point as a train set;

construct the XGBoost model, wherein the XGBoost model comprises a linear model constructed by using a linear regression algorithm, a classifier constructed by using an XGBoost algorithm and an XGBoost regression model constructed by using the XGBoost algorithm, the XGBoost algorithm is a tree-based learning;

train the XGBoost model, comprising training the linear model based on the train set, training the classifier based on the train set and an output of the linear model, and training the XGBoost regression based on the train set, the output of the linear model and an output of the classifier; and perform a demand forecasting procedure by using the XGBoost model after the XGBoost model is trained, comprising:

obtaining, through the linear model, a preliminary prediction amount corresponding to a part number by inputting the features to the linear model;

calculating, through the classifier, a demand probability of the part number by inputting the features and the preliminary prediction amount to the classifier, wherein the demand probability is a probability that a future demand of the part number is 0;

obtaining, through the XGBoost regression model, a prediction demand amount corresponding to the part number by inputting the features, the preliminary prediction amount and the demand probability to the XGBoost regression model, wherein the XGBoost regression model includes a plurality of trees for classification; and generating an inventory indicator report based on a result outputting from the XGBoost model; and performing a quantitative explanation corresponding to one of the features in response to receiving a quantitative explanation command of the one of the features, wherein the quantitative explanation is performed by deconstructing the XGBoost model.

8. The demand forecasting apparatus according to claim 7, wherein the processor is configured to:
wherein the features comprise a plurality of parameters corresponding to a plurality of previous periods, a plurality of parameter average values within a plurality of period ranges and a maximum value among the parameters included in each of the period ranges.

9. The demand forecasting apparatus according to claim 7, wherein the processor is configured to construct the classifier by using an XGBoost algorithm to input the features and the preliminary prediction amount to the classifier to obtain the demand probability.

10. The demand forecasting apparatus according to claim 7, wherein the processor is configured to deconstruct the XGBoost model to obtain an influence of each of the features in the historical demand data.

11. The demand forecasting apparatus according to claim 10, wherein the XGBoost model comprises a plurality of trees, the processor is configured to visit each node starting from a root node of each of the trees to a lowest layer, attributes a variation amount to the corresponding feature based on a rule corresponding to each node visited, and sums up the variation amounts corresponding to each of the features as the corresponding influence thereof.

12. The demand forecasting apparatus according to claim 7, wherein the processor is configured to:
determine a threshold based on a ratio of a number of the part numbers with a previous actual demand being zero to a total number of the part numbers;
in response to the demand probability corresponding to the part number greater than or equal to the threshold, set the prediction demand amount to zero; and
in response to the demand probability corresponding to the part number less than the threshold, output the prediction demand amount as a final prediction result.

* * * * *